US010017021B2

(12) United States Patent
Saieg et al.

(10) Patent No.: US 10,017,021 B2
(45) Date of Patent: Jul. 10, 2018

(54) AXLE SUSPENSION SYSTEM HAVING AN AXLE WRAP AND METHOD OF MANUFACTURE

(71) Applicant: ArvinMeritor Technology, LLC, Troy, MI (US)

(72) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 6 days.

(21) Appl. No.: 14/986,763

(22) Filed: Jan. 4, 2016

(65) Prior Publication Data

US 2017/0190230 A1    Jul. 6, 2017

(51) Int. Cl.
*B60B 35/00* (2006.01)
*B60G 9/00* (2006.01)

(52) U.S. Cl.
CPC ............ *B60G 9/003* (2013.01); *B60B 35/004* (2013.01); *B60G 2200/31* (2013.01); *B60G 2206/8201* (2013.01)

(58) Field of Classification Search
CPC ............... B60G 9/003; B60G 2200/31; B60G 2200/8201
See application file for complete search history.

(56) References Cited

U.S. PATENT DOCUMENTS

| | | | |
|---|---|---|---|
| 1,952,955 A * | 3/1934 | Trageser | B23K 5/12 138/169 |
| 2,120,007 A * | 6/1938 | Tear | B21D 51/2676 220/619 |
| 4,693,486 A | 9/1987 | Pierce et al. | |
| 4,995,636 A | 2/1991 | Hall et al. | |
| 5,112,078 A | 5/1992 | Galazin et al. | |
| 5,366,237 A | 11/1994 | Dilling et al. | |
| 5,375,871 A | 12/1994 | Mitchell et al. | |
| 5,690,353 A | 11/1997 | Vandenberg | |
| 6,241,266 B1 | 6/2001 | Smith et al. | |
| 6,491,314 B2 | 12/2002 | Smith et al. | |
| 6,508,393 B2 | 1/2003 | Chalin | |
| 6,508,482 B2 | 1/2003 | Pierce et al. | |
| 6,557,875 B2 | 5/2003 | Schlosser et al. | |
| 6,672,604 B2 | 1/2004 | Eveley | |

(Continued)

FOREIGN PATENT DOCUMENTS

| | | |
|---|---|---|
| DE | 102013212545 A1 | 12/2014 |
| WO | 0046052 A1 | 8/2000 |

(Continued)

OTHER PUBLICATIONS

United States Patent and Trademark Office, U.S. Appl. No. 14/638,049, filed Mar. 4, 2015.

(Continued)

*Primary Examiner* — James A English
(74) *Attorney, Agent, or Firm* — Brooks Kushman P.C.

(57) ABSTRACT

An axle suspension system and a method of manufacture. The axle suspension system may have an axle, an axle wrap, and a weld seam. The axle wrap may receive the axle and may have a first end portion and a second end portion that overlaps the first end portion. A weld seam may couple the first end portion to the second end portion.

20 Claims, 6 Drawing Sheets

(56) References Cited

U.S. PATENT DOCUMENTS

| | | | |
|---|---|---|---|
| 6,827,360 B2 | 12/2004 | Chan et al. | |
| 6,843,490 B2 | 1/2005 | Raidel, II et al. | |
| 7,048,288 B2 | 5/2006 | Chan et al. | |
| 7,077,411 B2 | 7/2006 | Peters et al. | |
| 7,171,988 B2 * | 2/2007 | Gejima | B21D 26/045 138/156 |
| 7,270,342 B2 | 9/2007 | Chan et al. | |
| 7,360,774 B2 | 4/2008 | Saieg et al. | |
| 7,484,744 B2 | 2/2009 | Galazin et al. | |
| 7,607,670 B2 | 10/2009 | Raidel, II et al. | |
| 7,669,866 B2 | 3/2010 | Peaker et al. | |
| 7,717,442 B2 | 5/2010 | Chalin | |
| 7,726,673 B2 | 6/2010 | Saieg et al. | |
| 7,731,211 B2 | 6/2010 | Ramsey | |
| 7,740,255 B2 | 6/2010 | Holt | |
| 8,002,297 B2 | 8/2011 | Keiserman | |
| 8,006,987 B2 | 8/2011 | Saieg et al. | |
| 8,029,008 B2 | 10/2011 | Cortez et al. | |
| 8,333,396 B2 * | 12/2012 | Saieg | B60G 9/003 280/124.116 |
| 8,528,923 B2 | 9/2013 | Wakefield et al. | |
| 8,991,839 B1 | 3/2015 | Saieg et al. | |
| 9,102,206 B1 | 8/2015 | Saieg et al. | |
| 2003/0111817 A1 * | 6/2003 | Fader | B60G 21/0551 280/124.166 |
| 2006/0163834 A1 * | 7/2006 | Brereton | B60G 7/001 280/124.128 |
| 2006/0192360 A1 * | 8/2006 | Chan | B60G 7/001 280/124.116 |
| 2007/0074940 A1 * | 4/2007 | Narishima | B60G 21/0551 188/321.11 |
| 2008/0029988 A1 * | 2/2008 | Saieg | B60G 7/001 280/124.116 |
| 2009/0072505 A1 * | 3/2009 | McGinnis | B60G 9/003 280/124.116 |
| 2013/0154224 A1 | 6/2013 | Wakefield et al. | |
| 2015/0266350 A1 * | 9/2015 | Morino | B60G 7/001 280/124.134 |
| 2016/0107495 A1 * | 4/2016 | Spielmann | B60G 9/003 280/124.128 |
| 2017/0239988 A1 | 8/2017 | Schuck | |

FOREIGN PATENT DOCUMENTS

| | | | |
|---|---|---|---|
| WO | 0220289 A1 | 3/2002 | |
| WO | WO-2014207191 A1 * | 12/2014 | ............ B60G 9/003 |

OTHER PUBLICATIONS

European Patent Office, Extended European Search Report for the corresponding European Patent Application No. 16204019.0 dated Oct. 16, 2017.

* cited by examiner

AXLE SUSPENSION SYSTEM HAVING AN AXLE WRAP AND METHOD OF MANUFACTURE

TECHNICAL FIELD

This disclosure relates to an axle suspension system having an overlapping axle wrap and a method of manufacture.

BACKGROUND

An axle suspension system having an axle wrap is disclosed in U.S. Pat. No. 8,528,923.

SUMMARY

In at least one embodiment, an axle suspension system is provided. The axle suspension system may include an axle, an axle wrap, and a weld seam. The axle may have an exterior axle surface. The axle wrap may extend around the exterior axle surface. The axle wrap may include an inner surface, an outer surface, a first end portion, and a second end portion. The inner surface may be disposed on the exterior axle surface. The outer surface may be disposed opposite the inner surface. The first end portion may have a first end surface that may extend from the inner surface to the outer surface. The second end portion may be disposed opposite the first end portion. The second end portion may have a second end surface that may extend from the inner surface to the outer surface. The second end portion may overlap the first end portion such that the first end portion may be disposed between the axle and the second end portion. The weld seam may fixedly couple the second end portion to the first end portion. The weld seam may be provided on the outer surface and may not engage the axle.

In at least one embodiment, a method of making an axle suspension system is provided. An axle wrap may be provided that may have an inner surface, an outer surface, a first end portion, and a second end portion. The inner surface may at least partially define an opening. The second end portion may be disposed opposite the first end portion and may overlap the first end portion. The axle may be inserted into the opening in the axle wrap. The axle wrap may be compressed against the axle. The axle wrap may be welded by providing a weld seam that may fixedly couple the second end portion to the first end portion. The weld seam may be provided on the outer surface of the axle wrap and may not engage the axle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
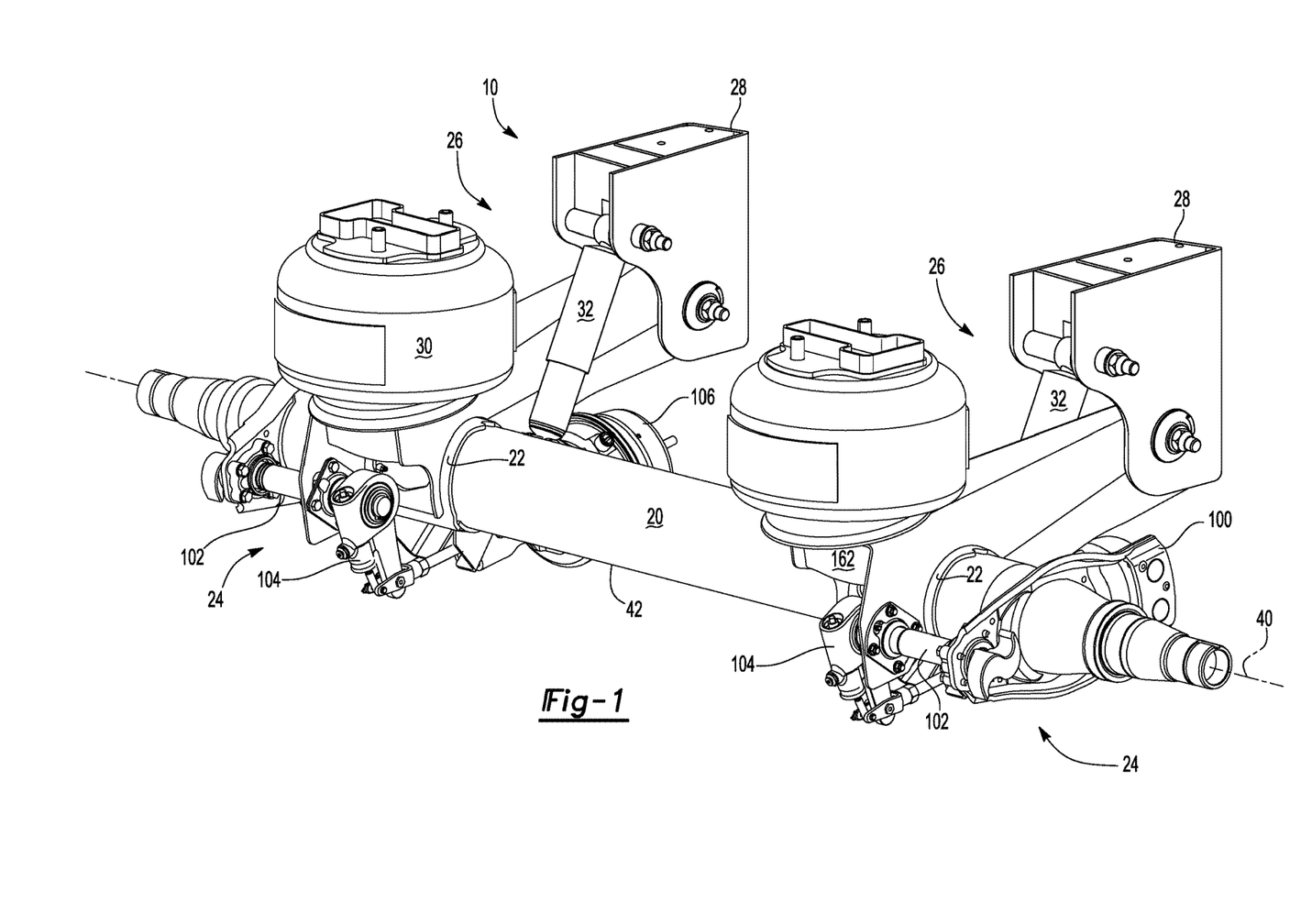
FIG. 1 is a perspective view of an axle suspension system having an axle wrap.

Referring to FIG. 1, an exemplary axle suspension system 10 is shown. The axle suspension system 10 may be provided with a vehicle, such as motor vehicle or a trailer that may be provided with a motor vehicle. The axle suspension system 10 may include an axle 20, an axle wrap 22, a brake subsystem 24, a trailing arm assembly 26, a hanger bracket 28, an air spring 30, and a shock absorber 32. In FIG. 1, a pair of axle wraps 22 is provided and one brake subsystem 24, trailing arm assembly 26, hanger bracket 28, air spring 30, and shock absorber 32 is associated with each axle wrap 22.

The axle 20 may extend along an axis 40 and may have an exterior axle surface 42. The exterior axle surface 42 may be an exterior circumference of the axle 20. At least one wheel hub assembly may be rotatably disposed on the axle 20. A wheel hub assembly may be provided at each end of the axle 20. Each wheel hub assembly may be configured to receive a wheel upon which a tire may be mounted.

The axle wrap 22 may be fixedly disposed on the axle 20. The axle wrap 22 may have a unitary or one-piece construction. The axle wrap 22 may extend around the exterior axle surface 42 of the axle 20. For example, the axle wrap 22 may extend completely around the exterior axle surface 42 by more than 360 degrees due to overlapping end portions of the axle wrap 22. In FIG. 1, two axle wraps 22 are shown that are completely spaced apart from each other. Each axle wrap 22 may be positioned between an associated trailing arm assembly 26 and the axle 20 and may facilitate mounting of the trailing arm assembly 26 to the axle 20. In at least one embodiment, the axle wrap 22 may include an inner surface 50, an outer surface 52, a first side surface 54, a second side surface 56, a first slot 58, a second slot 60, a first end portion 62, a second end portion 64, a weld seam 66, and one or more weld windows 68.

Figure 2:
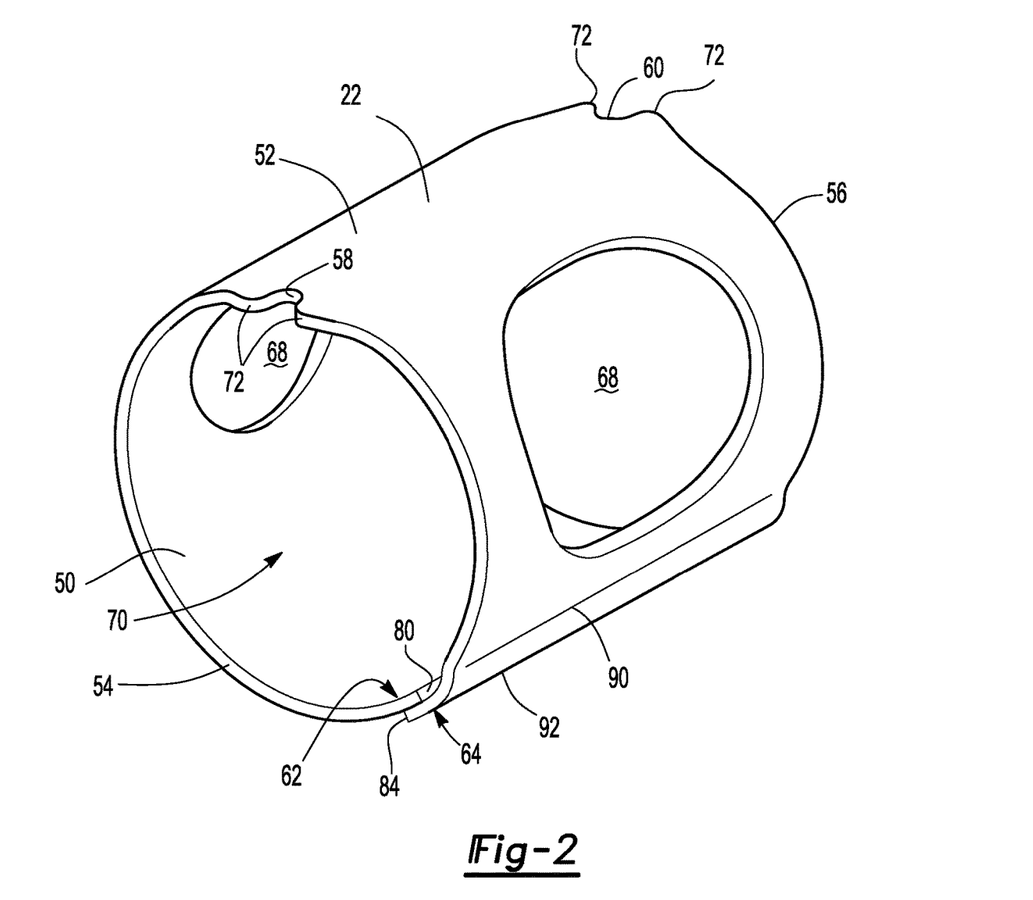
FIG. 2 is a perspective view of the axle wrap.

The inner surface 50 may be disposed on the exterior axle surface 42. Most of the inner surface 50 may be disposed at a substantially constant radial distance from the axis 40, with the exception of the second end portion 64. The inner surface 50 may not include any recesses or grooves that may extend partially through the axle wrap 22, such as may be provided to receive a backing strip that may bridge a gap between non-overlapping opposite ends of an axle wrap to accommodate gap variation that may be caused by axle diameter tolerances. The inner surface 50 may at least partially define an opening 70 or hole that may receive the axle 20.

The outer surface 52 may be disposed opposite the inner surface 50. In addition, the outer surface 52 may be disposed substantially parallel to the inner surface 50. As such, the axle wrap 22 may have a substantially constant thickness from the inner surface 50 to the outer surface 52.

The first side surface 54 may extend from the inner surface 50 to the outer surface 52. In addition, the first side surface 54 may be disposed substantially perpendicular to the exterior axle surface 42, the inner surface 50, and the outer surface 52 in one or more embodiments.

The second side surface 56 may be disposed opposite the first side surface 54. The second side surface 56 may extend from the inner surface 50 to the outer surface 52. In addition, the second side surface 56 may be disposed substantially perpendicular to the exterior axle surface 42, the inner surface 50, and the outer surface 52 in one or more embodiments.

The first slot 58 may be disposed proximate the top of the axle 20 and may facilitate assembly of the axle wrap 22 to the axle 20 as will be discussed in more detail below. The first slot 58 may be provided in the first side surface 54 or may extend into the first side surface 54 and toward the second side surface 56. In addition, the first slot 58 may extend from the inner surface 50 to the outer surface 52. The first slot 58 may be an open ended slot that may be defined by a curved or arcuate surface.

The first slot 58 may be disposed proximate or adjacent to one or more protrusions 72. In FIG. 2, two protrusions 72 are shown that are disposed on opposite sides of the first slot 58 such that the first slot 58 may extend from a first protrusion 72 to a second protrusion 72. The first and second protrusions 72 may be disposed on the exterior axle surface 42 and may extend away from the second side surface 56. The protrusions 72 may extend outwardly from the first side surface 54 or may be configured as bulges in the first side surface 54. In addition, the protrusions 72 may extend along an arc or curve with respect to the first slot 58 and an adjacent portion of the first side surface 54. Such a configuration may help reduce localized stress concentrations in the axle wrap 22.

The second slot 60 may be disposed proximate the top of the axle 20 and may be disposed opposite the first slot 58. The second slot 60 may be provided in the second side surface 56 or may extend into the second side surface 56 and toward the first side surface 54. In addition the second slot 60 may extend from the inner surface 50 to the outer surface 52. The second slot 60 may also facilitate assembly of the axle wrap 22 to the axle 20 as will be discussed in more detail below.

The second slot 60 may be disposed proximate or adjacent to one or more protrusions 72 similar to the protrusions 72 associated with the first slot 58. In FIG. 2, two protrusions 72 are shown that are disposed on opposite sides of the second slot 60 such that the second slot 60 may extend from a third protrusion 72 to a fourth protrusion 72. The third and fourth protrusions 72 may be disposed on the exterior axle surface 42 and may extend away from the first side surface 54. The protrusions 72 may extend outwardly from the second side surface 56 or may be configured as bulges in the second side surface 56. In addition, the protrusions 72 may extend along an arc or curve with respect to the second slot 60 and an adjacent portion of the second side surface 56.

The first end portion 62 may be disposed at a first end of the axle wrap 22 and may be overlapped by the second end portion 64. The first end portion 62 may have a first end surface 80. The first end surface 80 may extend from the inner surface 50 to the outer surface 52 and may extend from the first side surface 54 to the second side surface 56. The first end surface 80 may extend from the exterior axle surface 42 to a region of the inner surface 50 that may be provided with the second end portion 64. The first end surface 80 may be spaced apart from the second end portion 64. For example, the first end surface 80 may face toward and may be spaced apart from the region of the inner surface 50 that may extend outwardly away from the axle 20 and may be disposed opposite the first end surface 80. As such, a small gap 82 may be located adjacent to the first end surface 80. For instance, the gap 82 may be located between the first end surface 80, exterior axle surface 42, and a region of the inner surface 50 that may be provided with the second end portion 64.

The second end portion 64 may be disposed opposite the first end portion 62. The second end portion 64 may have a second end surface 84. The second end surface 84 may extend from the inner surface 50 to the outer surface 52 and may extend from the first side surface 54 to the second side surface 56. The second end portion 64 may overlap the first end portion 62 such that the first end portion 62 may be disposed between the exterior axle surface 42 of the axle 20 and the second end portion 64. For instance, the second end portion 64 may bend away from the exterior axle surface 42 at a first bend 90 and may bend again at a second bend 92. The region of the inner surface 50 located between the second bend 92 and the second end surface 84 may be disposed substantially parallel to the region of the outer surface 52 of the first end portion 62. The second end surface 84 may be located outward of the first end portion 62 and may extend outwardly from a region of the outer surface 52 that is provided with the first end portion 62.

The weld seam 66 may fixedly couple the second end portion 64 to the first end portion 62. The weld seam 66 may be provided on the outer surface 52 adjacent to the second end surface 84 and may extend the full thickness of the axle wrap 22 or full height of the second end surface 84. The weld seam 66 may extend continuously from the first side surface 54 to the second side surface 56. In addition, the weld seam 66 may be spaced apart from and may not engage the axle 20.

Figure 3:
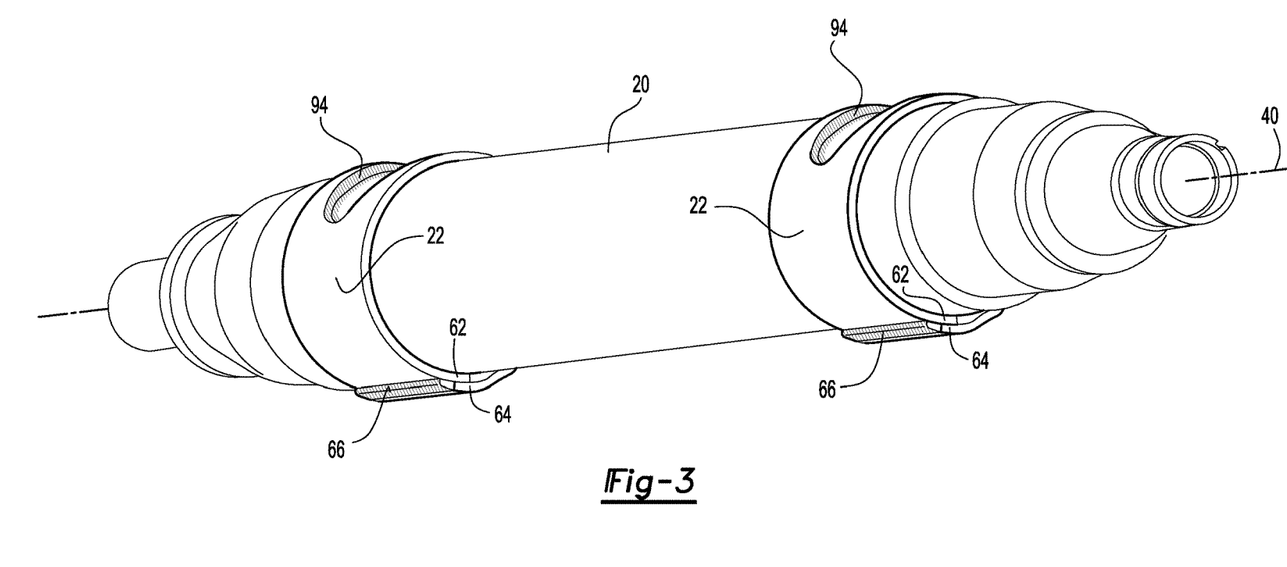
FIG. 3 is a perspective view of an axle wrap that is welded to the axle.

One or more weld windows 68 may be provided with the axle wrap 22. A weld window 68 may receive a weld 94 that may join the axle wrap 22 to the axle 20. In the embodiment shown, two weld windows 68 are provided that are configured as through holes that are completely disposed in the axle wrap 22. As such, the weld windows 68 may extend from the inner surface 50 to the outer surface 52. One or more weld windows 68 may be completely disposed above the first end portion 62, the second end portion 64, and the weld seam 66. In addition, the weld windows may be positioned such that the center of a weld window 68 may be located above the neutral axis of the axle 20, which may help reduce stress on a weld 94. More specifically, positioning the center of a weld window 68 above the neutral axis of the axle may move the bottom of a weld window upward and away from the higher tensile stress area at the bottom of the axle 20, which in turn may allow the portion of the weld 94 located at the bottom of a weld window 68 to be located closer to the neutral axis, thereby helping reduce tensile stress on the weld 94 that may occur when the axle 20 bends or flexes.

Referring to FIG. 1, the brake subsystem 24 may be configured to brake or inhibit rotation of an associated wheel hub assembly. The brake subsystem 24 may be mounted to the axle 20 proximate an end of the axle 20. The brake subsystem 24 may be configured as a friction brake, such as a drum brake assembly. In at least one embodiment, the brake subsystem 24 may include a brake torque plate or a brake spider 100, a cam shaft 102, a slack adjuster 104, and an actuator 106.

The brake spider 100 may facilitate mounting of the brake assembly to the axle 20. The brake spider 100 may be fixedly disposed on the axle 20 between the wheel hub assembly or an end of the axle 20 and the trailing arm assembly 26.

The cam shaft 102 may be mounted to the brake spider 100 and the trailing arm assembly 26. The cam shaft 102 may include a brake cam, which may also be referred to as an S-cam. The brake cam may be disposed at a first end of the cam shaft 102 and may be configured to actuate one or more brake pad assemblies when the cam shaft 102 is rotated or pivoted about its axis.

The slack adjuster 104 may be provided to compensate for friction brake wear or wear of friction material of a brake pad of the brake subsystem 24. The slack adjuster 104 may disposed at second end of the cam shaft 102.

The actuator 106 may actuate the cam shaft 102 and its brake cam to apply or release the friction brake. The actuator 106 may be of any suitable type, such as a pneumatic actuator or an electronic actuator. The actuator 106 may include an actuator shaft that may extend to the slack adjuster 104. The actuator shaft may move between a retracted position and an extended position. The cam shaft 102 may rotate in response to extension of the actuator shaft such that the brake subsystem 24 may inhibit rotation of an associated wheel hub assembly.

The trailing arm assembly 26 may be fixedly disposed on the axle wrap 22. The trailing arm assembly 26 may be disposed between and may be spaced apart from the first side surface 54 and the second side surface 56 of the axle wrap 22. In addition, the trailing arm assembly 26 may be disposed between and may be spaced apart from the first slot 58 and the second slot 60.

The hanger bracket 28 may facilitate mounting of the axle suspension system 10 to a frame or chassis of the vehicle. The hanger bracket 28 may be spaced apart from the axle 20 and may be pivotally mounted to the trailing arm assembly 26. The shock absorber 32 may be pivotally mounted to the hanger bracket 28.

The air spring 30 may be mounted to the trailing arm assembly 26. The air spring 30 may be located between the trailing arm assembly 26 and the frame or chassis of the vehicle.

The shock absorber 32 may be provided to dampen impulses and to dissipate kinetic energy transmitted to the axle suspension system 10. The shock absorber 32 may be pivotally mounted to the hanger bracket 28 at a first end and may be pivotally mounted to the trailing arm assembly 26 at a second end.

Figure 6:
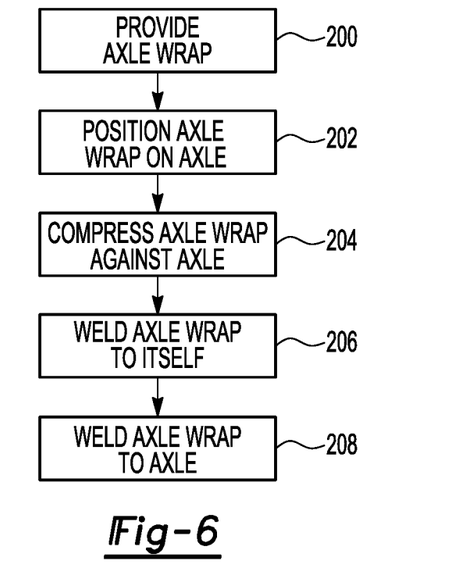
FIG. 6 is a flowchart of a method of making an axle suspension system.

Referring to FIG. 6, a flowchart of an exemplary method of making an axle suspension system is shown.

At block 200, the axle wrap may be provided or fabricated. For instance, the axle wrap 22 may be made from a sheet of material, such as sheet metal. The sheet may be stamped to form a blank that may define the outer perimeter surfaces of the axle wrap 22 and the weld windows 68. In addition, the second end portion 64 may be formed and offset from the remainder of the blank during stamping or in a subsequent bending process. Next, the blank may be formed around a die, such as a horn die, into the generally cylindrical or tubular axle wrap configuration shown in FIG. 4 in which the second end portion 64 may overlap the first end portion 62 and the axle wrap 22 has the opening 70. The opening 70 may be slightly larger than the outside diameter of the axle 20 to facilitate positioning on the axle 20. The axle wrap 22 may then be removed from the die and may be ready to assemble to the axle 20.

At block 202, the axle wrap may be positioned on the axle. For instance, the axle wrap 22 may be slid along the exterior axle surface 42 to a desired attachment location or the axle 20 may be inserted into the opening 70 in the axle wrap 22. The axle wrap 22 may have a larger inside diameter than the outside diameter of the axle 20 before the axle wrap is compressed against the axle 20.

Figure 4:
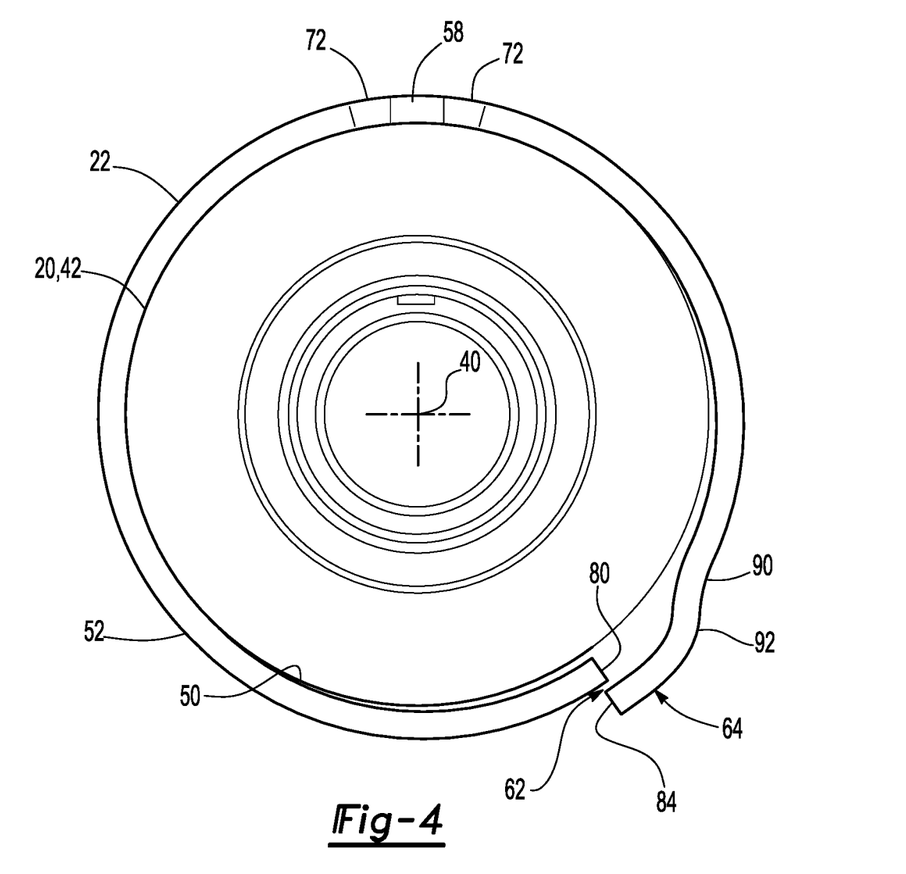
FIG. 4 shows the axle wrap disposed on an axle prior to compressing the axle wrap.
Figure 5:
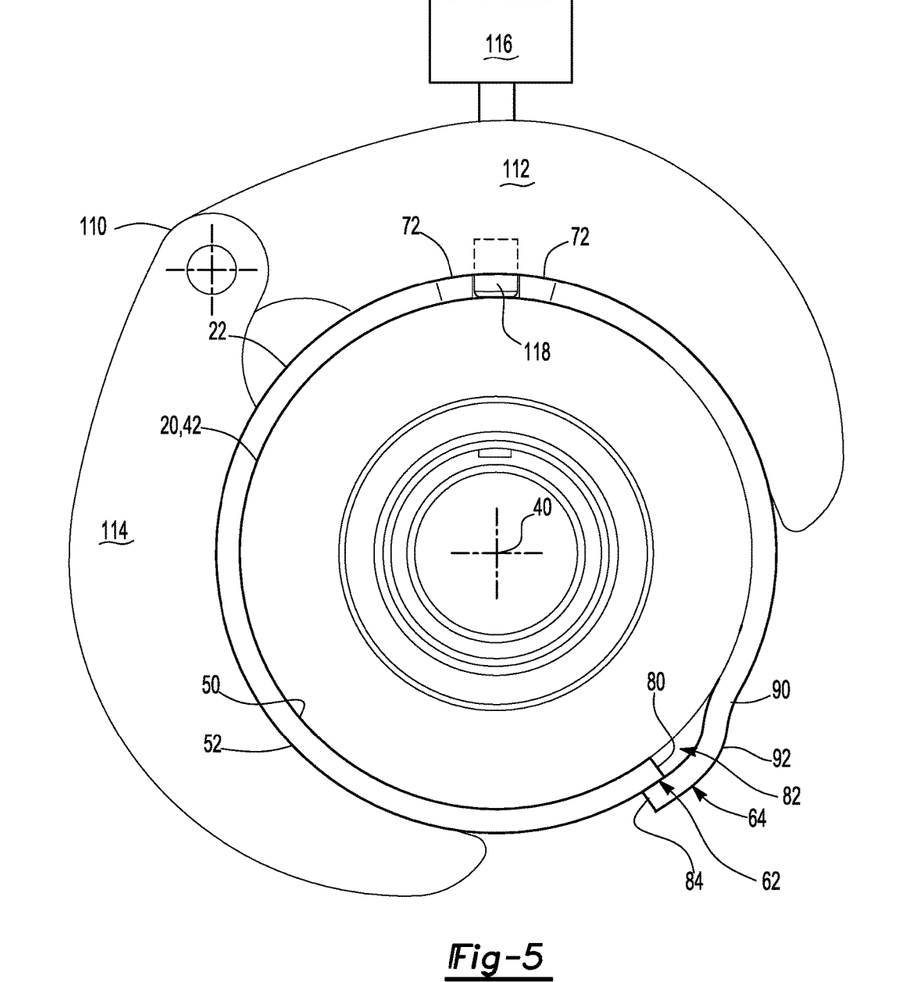
FIG. 5 shows the axle wrap compressed against the axle.

At block 204, the axle wrap may be compressed against the axle. Compression of the axle wrap 22 is best shown by comparing FIG. 4 to FIG. 5. In FIG. 4, the axle wrap 22 is not compressed against the axle 20. As such, there may be a small gap between the inner surface 50 of the axle wrap 22 and the exterior axle surface 42 of the axle 20. In FIG. 5, the axle wrap 22 is compressed against the axle 20. The axle wrap 22 may move closer to the axle 20 when axle wrap 22 is compressed. As such, the axle wrap 22 may engage substantially the entirety of the exterior axle surface 42 when the axle wrap 22 is compressed. In addition, due to the overlapping first and second end portions 62, 64, the first end surface 80 may move away from the second end surface 84 when the axle wrap 22 is compressed. As such, the axle wrap 22 accommodates axle diameter variation without the use of any backing strips.

The axle wrap 22 may be compressed against the axle 20 with a clamp unit 110. An exemplary claim unit 110 is shown in FIG. 5. The clamp unit 110 may engage and exert force on the outer surface 52 of the axle wrap 22 to compress the axle wrap 22 toward the axle 20 or toward the axis 40. In at least one embodiment, the clamp unit 110 may include a first clamp 112 and a second clamp 114 that may be positionable with respect to each other. For instance, the first clamp 112 and the second clamp 114 may pivot with respect to each other about a pivot axis. At least one actuator 116 may actuate the first clamp 112, the second clamp 114, or the first clamp 112 and the second clamp 114. The actuator 116 may be of any suitable type, such as a hydraulic cylinder.

A portion of the clamp unit 110, such as the first clamp 112 or the second clamp 114, may be provided with one or more pins 118 that may help locate and position the axle wrap 22 with respect to the clamp unit 110. For instance a first pin 118 may be received in the first slot 58 of the axle wrap 22 and a second pin 118 may be received in the second slot 60 of the axle wrap 22 to position the axle wrap 22 with respect to the axle 20. In FIG. 5, the second pin 118 may be disposed behind the first pin 118 and the axle wrap 22.

At block 206, the axle wrap 22 may be welded to itself. More specifically, the weld seam 66 may be provided to fixedly couple the first end portion 62 of the axle wrap 22 to the second end portion 64 of the axle wrap 22, but may not weld the axle wrap 22 to the axle 20. The weld seam 66 may be provided on the outer surface 52 of the axle wrap 22 and may not engage the axle 20 as previously discussed. The clamp unit 110 may continue to compress the axle wrap 22 when the axle wrap 22 is provided with the weld seam 66. In addition, weld seam 66 may be allowed to cool before welding the axle wrap 22 to the axle 20. Allowing the weld seam 66 to cool may allow the weld seam 66 to contract to help further secure the axle wrap 22 against the axle 20.

At block 208, the axle wrap 22 may be welded to the axle 20. The axle wrap 22 may be welded to the axle 20 by providing at least one weld 94 in at least one weld window 68 of the axle wrap 22. Such a weld may extend continuously around the weld window 68 in one or more embodiments.

The system and method described above may allow an axle wrap to be provided and assembled to an axle without additional components, such as a backing strip and ceramic tape that may be disposed between the axle wrap and the axle. A backing strip may bridge the gap between opposite end surfaces of the axle wrap. Such backing strips may be provided in multiple sizes and may be custom fit to the axle, which increases cost and manufacturing steps. Because the backing strip will not be a perfect fit, ceramic tape is provided between the backing strip and the axle to prevent the weld from contacting the axle. As such, eliminating the backing strip may allow the ceramic tape to be eliminated, which may also reduce cost and manufacturing steps.

Eliminating the backing strip also allows an axle wrap to be provided without machining grooves or recesses in the inner surface to accommodate the backing strip. For instance, grooves may be provided at opposite ends of the axle wrap that provide space to receive the backing strip. Such grooves or recesses may reduce the thickness of the axle wrap and may reduce the strength of the axle wrap as compared with the present invention. Providing a backing strip may also reduce the height or thickness of a weld that may be provided between the ends of the axle wrap, which reduces strength. The present invention allows the height of the weld seam to be equal to the full thickness of the axle wrap, which may allow an axle wrap to be provided with a reduced material thickness as compared to an axle wrap that employs a backing strip, thereby reducing cost and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
   an axle having an exterior axle surface;
   an axle wrap that extends around the exterior axle surface, the axle wrap including:
      an inner surface that is disposed on the exterior axle surface;
      an outer surface that is disposed opposite the inner surface and is spaced apart from the outer surface;
      a first end portion that has a first end surface that extends from the inner surface to the outer surface; and
      a second end portion that is disposed opposite the first end portion, wherein the second end portion has a second end surface that extends from the inner surface to the outer surface, a first bend, and a second bend disposed between the first bend and the second end surface, wherein the axle wrap bends away from the exterior axle surface at the first bend and the second end portion overlaps the first end portion between the second bend and the second end surface such that the first end portion is disposed between the axle and the second end portion, wherein the axle wrap has a substantially constant thickness from the inner surface to the outer surface and from the first end surface to the second end surface, the outer surface extends from the first end surface to the second end surface, and the outer surface is disposed further from the axis from the second bend to the second end surface than from the first end surface to the first bend; and
   a weld seam that fixedly couples the second end portion to the first end portion, wherein the weld seam is provided on the outer surface and does not engage the axle.

2. The axle suspension system of claim 1 wherein the first end surface extends from the exterior axle surface to a region of the inner surface that is provided with the second end portion.

3. The axle suspension system of claim 2 wherein the first end surface is spaced apart from the region of the inner surface that is provided with the second end portion.

4. The axle suspension system of claim 2 wherein the second end surface extends from a region of the outer surface that is provided with the first end portion.

5. The axle suspension system of claim 1 wherein the axle wrap has a first weld window that is completely disposed in the axle wrap, wherein the first weld window is completely disposed above the weld seam and receives a weld that joins the axle wrap to the axle.

6. The axle suspension system of claim 1 wherein the axle wrap further comprises:
   a first side surface that extends from the inner surface to the outer surface; and
   a second side surface that extends from the inner surface to the outer surface and that is disposed opposite the first side surface;
   wherein the weld seam extends from the first side surface to the second side surface.

7. The axle suspension system of claim 6 wherein the axle wrap has a first slot that extends from the first side surface toward the second side surface and that extends from the outer surface to the inner surface.

8. The axle suspension system of claim 7 wherein the axle wrap has a first protrusion and a second protrusion that extend away from the second side surface and are disposed on opposite sides of the first slot such that the first slot extends from the first protrusion to the second protrusion.

9. The axle suspension system of claim 8 wherein the axle wrap has a second slot that extends from the second side surface toward the first side surface and that extends from the outer surface to the inner surface.

10. The axle suspension system of claim 9 wherein the axle wrap has a third protrusion and a fourth protrusion that extend away from the first side surface and are disposed on opposite sides of the second slot such that the second slot extends from the third protrusion to the fourth protrusion.

11. The axle suspension system of claim 9 further comprising a trailing arm assembly that is mounted on the axle wrap, wherein the trailing arm assembly is disposed between and is spaced apart from the first slot and second slot.

12. A method of making an axle suspension system comprising:
   stamping a sheet of material having a substantially constant thickness into a blank that has an inner surface, an outer surface disposed opposite the inner surface, a first end portion that has a first end surface, and a second end portion that is disposed opposite the first end portion and that has a second end surface;
   bending the blank to provide a first bend and to provide a second bend that is disposed between the first bend and the second end surface to offset the second end portion from a remainder of the blank;
   subsequently further forming the blank such that the second end portion overlaps the first end portion;
   positioning the axle wrap on an axle such that axle wrap bends away from an exterior axle surface of the axle at the first bend and the second end portion overlaps the first end portion between the second bend and the second end surface;
   compressing the axle wrap against the axle; and
   welding the axle wrap with a weld seam that fixedly couples the second end portion to the first end portion, wherein the weld seam is provided on the outer surface and does not engage the axle.

13. The method of claim 12 further comprising allowing the weld seam to cool and then welding the axle wrap to the axle with a weld that is disposed in a weld window of the axle wrap after the weld seam cools.

14. The method of claim 12 wherein compressing the axle wrap against the axle includes engaging a clamp unit against the outer surface of the axle wrap and compressing the axle wrap toward the axle.

15. The method of claim 14 wherein the clamp unit compresses the axle wrap when the axle wrap is welded with the weld seam.

16. The method of claim 14 wherein the axle wrap has a first side surface that extends from the inner surface to the outer surface and a second side surface that extends from the inner surface to the outer surface and that is disposed opposite the first side surface, wherein the weld seam extends from the first side surface to the second side surface.

17. The method of claim 16 wherein the axle wrap has a first slot that extends from the first side surface toward the second side surface and a second slot that extends from the second side surface toward the first side surface, wherein the clamp unit has a first pin that is received in the first slot and a second pin that is received in the second slot to position the axle wrap on the axle.

18. The method of claim 14 wherein the first end surface moves away from the second end surface when the clamp unit compresses the axle wrap.

19. The method of claim 18 wherein a gap is provided between the first end surface, the exterior axle surface, and a region of the inner surface that is provided with the second end portion.

20. A method of making an axle suspension system comprising:
    providing an axle wrap that has an inner surface that at least partially defines an opening, an outer surface that is disposed opposite the inner surface and is spaced apart from the inner surface, a first end portion that has a first end surface, and a second end portion that is disposed opposite the first end portion and that overlaps the first end portion, wherein the axle wrap has a substantially constant thickness and the second end portion has a second end surface that is disposed opposite the first end surface, a first bend, and a second bend disposed between the first bend and the second end surface, wherein the axle wrap has a substantially constant thickness from the inner surface to the outer surface and from the first end surface to the second end surface, the outer surface extends from the first end surface to the second end surface, and the outer surface is disposed further from the axis from the second bend to the second end surface than from the first end surface to the first bend;
    positioning the axle wrap on an axle such that axle wrap bends away from an exterior axle surface of the axle at the first bend and the second end portion overlaps the first end portion between the second bend and the second end surface;
    compressing the axle wrap against the axle; and
    welding the axle wrap with a weld seam that fixedly couples the second end portion to the first end portion, wherein the weld seam is provided on the outer surface and does not engage the axle.

* * * * *

UNITED STATES PATENT AND TRADEMARK OFFICE
CERTIFICATE OF CORRECTION

PATENT NO. : 10,017,021 B2
APPLICATION NO. : 14/986763
DATED : July 10, 2018
INVENTOR(S) : Steven George Saieg et al.

Page 1 of 1

It is certified that error appears in the above-identified patent and that said Letters Patent is hereby corrected as shown below:

Column 8, Line 58, Claim 12:
After "on an axle such that"
Insert -- the --.

Column 10, Line 22, Claim 20:
After "on an axle such that"
Insert -- the --.

Signed and Sealed this
Fourth Day of December, 2018

Andrei Iancu
*Director of the United States Patent and Trademark Office*